United States Patent [19]
Helbig

[11] Patent Number: 5,494,013
[45] Date of Patent: Feb. 27, 1996

[54] ENGINE PRE-LUBRICATING SYSTEM

[76] Inventor: Jim D. Helbig, P.O. Box 500698, Marathon, Fla. 33050-0698

[21] Appl. No.: 422,981

[22] Filed: Apr. 17, 1995

[51] Int. Cl.$^6$ .................................................. F01M 5/00
[52] U.S. Cl. .......................................... 123/196 S; 184/6.3
[58] Field of Search ........................... 123/196 R, 196 S; 184/6.3, 6.4; 137/192, 206

[56] References Cited

U.S. PATENT DOCUMENTS

| | | | |
|---|---|---|---|
| 4,061,204 | 12/1977 | Kautz, Jr. | 123/196 S |
| 4,094,293 | 6/1978 | Evans | 123/196 S |
| 4,359,140 | 11/1982 | Shreve | 123/196 S |
| 4,513,704 | 4/1985 | Evans | 123/196 S |
| 4,524,734 | 6/1985 | Miller | 123/196 S |
| 5,069,177 | 12/1991 | Dokonal | 123/196 S |
| 5,156,120 | 10/1992 | Kent | 123/196 S |
| 5,197,424 | 3/1993 | Blum | 123/196 S |
| 5,348,121 | 9/1994 | McLaughlin | 184/6.3 |

FOREIGN PATENT DOCUMENTS 0452119  10/1948  Canada ........................... 123/196 S

*Primary Examiner*—Erick R. Solis
*Attorney, Agent, or Firm*—Malloy & Malloy

[57] ABSTRACT

To be used with an internal combustion engine having an oil reserve wherein engine oil is contained, and an engine internal oil pressure system structured to distribute lubricating oil to the wearing parts of the engine from the oil reserve of the engine, a pre-starting lubrication system which includes an oil reservoir to contain a quantity of engine oil to be supplied through an oil flow corridor of the reservoir to the engine internal oil pressure system for pre-starting lubrication of the wearing parts of the engine. The pre-starting lubrication system is structured to constantly maintain an acceptable supply of oil within the reservoir and will supply pre-starting lubricating oil upon a flow of pressurized air being directed into the oil reservoir, through an air flow corridor, so as to displace oil contained in the reservoir out through the oil flow corridor for pre-starting lubrication of the engine.

14 Claims, 2 Drawing Sheets

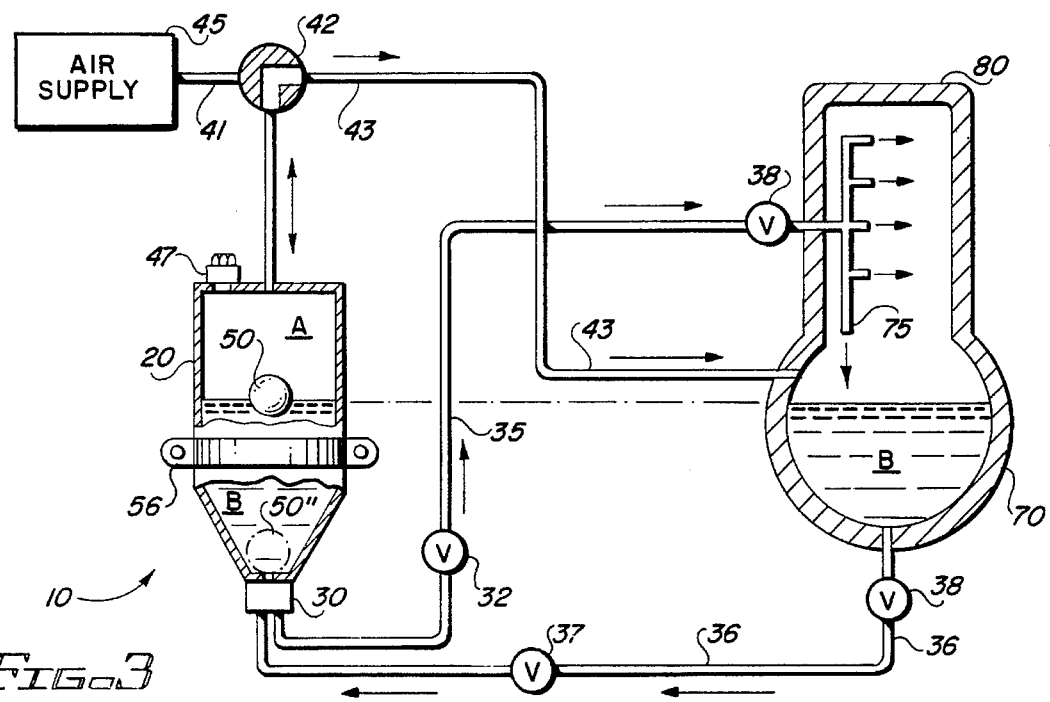
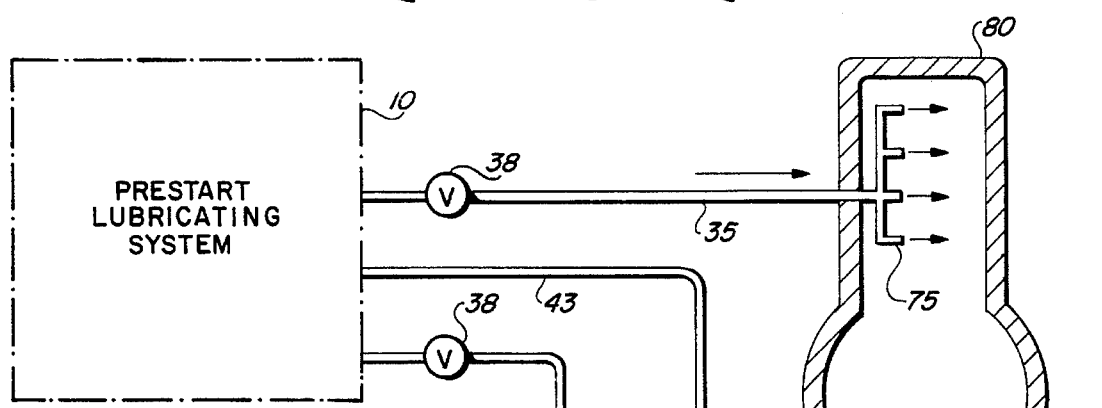
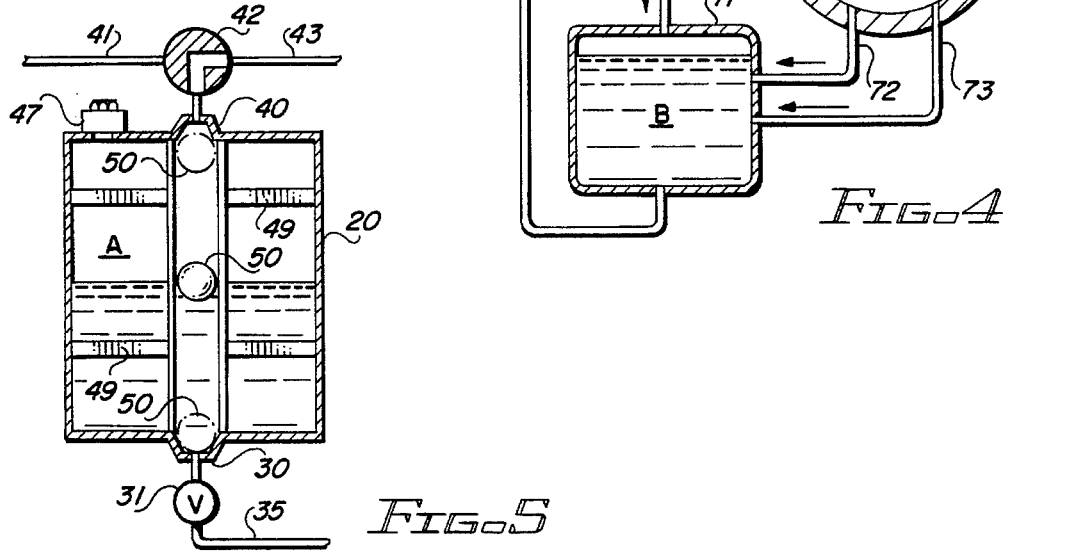

ENGINE PRE-LUBRICATING SYSTEM

BACKGROUND OF THE INVENTION

1. Field of the Invention

The present invention relates to a pneumatically actuated pre-starting lubrication system to be used primarily with an internal combustion, piston engine, which is easy to install and operate in order to provide pre-starting lubrication to the engine and eliminate the need for the engine to run for a period of time, without lubrication, until the normal engine operation provides lubrication.

2. Description of the Related Art

It is a known fact that a main source of the wear and tear that can affect an engine results from a cold start up of an unlubricated engine. Specifically, after sitting for even a short period of time, the internal wearing parts within an internal combustion engine lose a substantial amount of the oil lubricant, which coats their surface, therefore requiring an initial start up with insufficient lubrication. As a result, many engine oils are being specifically manufactured with properties that will help the oil remain on the wearing parts for an extended period of time, thereby providing some lubrication for start up after the engine has been sitting idle. These improved oils, however, do not completely solve the problem, especially if the engine, such as in boats, trucks, heavy machinery, power plants, or other applications, remains idle for an extended period of time.

As a result, mechanical systems have been devised consisting of a motor and oil pump along with associated wiring, relays and controls, which is started just a few seconds before starting the engine. The pump takes oil from the engine crankcase or oil reservoir and forces it into the engine internal oil pressure system such that the wearing parts are properly lubricated before the engine is started. Immediately upon starting, the internal engine oil pump starts supplying oil to all the moving and wearing parts and the pre-lubricating pump and motor is shut down. This type of system, however, is expensive, complicated, difficult to install and has many moving and wearing parts, such as the pump and motor, which are subject to maintenance and wearout. Accordingly, such systems are not widely implemented, especially in circumstances of retro-fitting existing engines.

As a result, there is still a substantial need in the art for a pre-starting lubrication system which is inexpensive, simple, has very few if any moving or wearing parts, can be easily and economically installed for use with existing engines or newly manufactured engines, and will efficiently and effectively provide sufficient oil for pre-starting lubrication to the moving & wearing parts of the engine prior to engine start up. Further, there is a need for a system that is easy and convenient to operate and which will remain in a ready mode with sufficient oil for each start up. The system of the present invention is designed specifically to meet these needs.

SUMMARY OF THE INVENTION

The present invention relates to a pre-starting lubrication system to be utilized primarily on an internal combustion piston engine of the type having a crankcase, wherein engine lubricating oil is contained, and an integral engine driven oil pump and pressure system structured to distribute lubricating oil to all of the moving and wearing parts of the engine.

Specifically, the pre-starting lubrication system will include an oil reservoir which will contain a quantity of engine oil therein to be utilized in the pre-lubrication process. Further included with the oil reservoir is an air flow corridor wherethrough air will enter and exit the oil reservoir and an oil flow corridor wherethrough oil will enter and exit the oil reservoir. The oil reservoir is connected in fluid flow communication with the engine internal oil pressure system by an oil conduit, thereby allowing the oil to flow from the reservoir to lubricate the wearing parts prior to starting. Connected in fluid flow communication with the air flow corridor are air supply means and air venting means. The air supply means are connected by way of an air conduit with the air flow corridor and are structured to supply a quantity of air under pressure into the oil reservoir through the air flow corridor. As to the air venting means, they are connected to the air flow corridor so as to vent pressurized air from the reservoir.

The pre-starting lubrication is initiated by switching means which initiate and maintain air flow from the air supply means through the air flow corridor and into the oil reservoir in such a manner as to push oil out of the oil reservoir, through the oil flow corridor, and into the engine internal oil pressure system wherein the oil is distributed to the wearing parts for a predetermined time after which the air supply means are shut off and pressurized air in the oil reservoir is vented by the air venting means.

Further included with the pre-starting lubrication system are oil supply means. The oil supply means ensure that the quantity of engine oil for use in pre-starting lubrication is continuously supplied to the oil reservoir. Additionally, in order to ensure that the oil reservoir does not become overfilled or underfilled, level maintenance means are included. The level maintenance means protect the engine by preventing total emptying of the oil reservoir and thereby ensuring that air does not exit the oil reservoir through the oil flow corridor where it can adversely affect the engine pressure lubricating system. The level maintenance means also detect and prevent overfilling of the oil reservoir, thereby ensuring that the excess oil does not adversely affect the air supply means and will not drain the oil system of the engine.

It is an object of the present invention to provide a pre-starting lubrication system which is easy to install, is cost effective, and has no moving and wearing parts, which is to be used on existing engine configurations or installed as original equipment on new engines in order to provide for effective and economical pre-starting lubrication of the engine's wearing parts.

An additional object of the present invention is to provide a pre-starting lubrication system which will not require the engine to be running in order to supply a quantity of lubricating oil to the moving and wearing parts.

Another object of the present invention is to provide a pre-starting lubrication system which can be effectively utilized and implemented on engines which remain idle for extended periods of time such as boat or truck engines or auxiliary or emergency power plants.

Also an object of the present invention is to provide a pre-starting lubrication system which does not require independent filling with oil in order to maintain a consistent necessary oil reserve for pre-starting lubrication.

Yet another object of the present invention is to provide a pre-starting lubrication system which will not allow unwanted air to be injected into the internal oil pressure system.

An additional object of the present invention is to provide a pre-starting lubrication system which will always maintain the necessary quantity of oil reserve for pre-starting lubrication and will not allow depletion of the oil in the engine oil systems.

A further object of the present invention is to provide a pre-starting lubrication system which has no mechanically driven or driving parts.

Also an object of the present invention is to provide a pre-starting lubrication system which will extend the life of an internal combustion engine by insuring that initial start up of the engine will occur under properly lubricated conditions.

BRIEF DESCRIPTION OF THE DRAWINGS

For a fuller understanding of the nature of the present invention, reference should be had to the following detailed description taken in connection with the accompanying drawings in which:

FIG. 3 is a schematic view of a third embodiment of the pre-starting lubrication system of the present invention;

FIG. 4 is a schematic partial view wherein the engine has its oil reservoir separate from the crankcase;

FIG. 5 is a schematic partial view illustrating an alternative embodiment including a locating guide for the stopper float.

Like reference numerals refer to like parts throughout the several views of the drawings.

DETAILED DESCRIPTION OF THE PREFERRED EMBODIMENT

Figure 1:
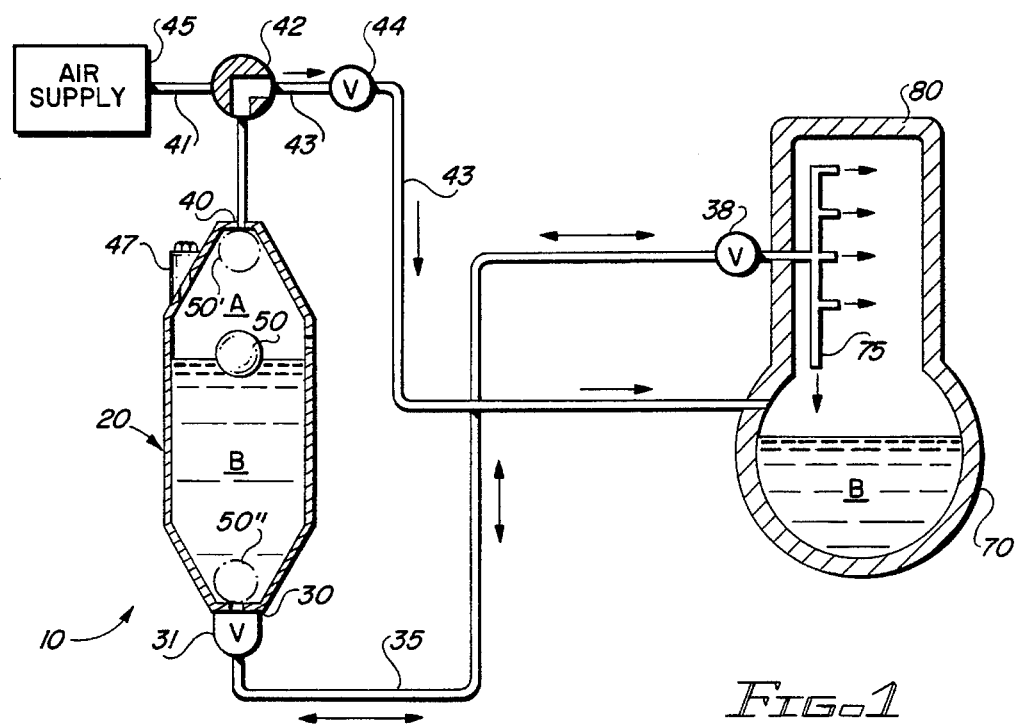
FIG. 1 is a schematic view of a first embodiment of the pre-starting lubrication system of the present invention.

Shown throughout the figures, the present invention is directed towards a pre-starting lubrication system, generally indicated as 10. The pre-starting lubrication system 10 is structured for utilization with any type of internal combustion engine 80 which includes an engine oil reserve 70, such as a reserve in the crank case 70 of the engine 80 or in a separate oil reserve 71, structured to contain and supply lubricating oil to all of the moving and wearing parts of the engine 80, by way of an engine internal oil pressure system 75. Specifically, conventional internal combustion engines 80 will draw oil from the engine oil reserve 70 only after the engine is started and operational, so as to direct the oil into the pressure system for lubrication of all moving and wearing parts to prevent breakdown.

Turning specifically to the pre-starting lubrication system 10 of the present invention, it includes an oil reservoir 20 wherein a quantity of engine oil is contained for pre-starting lubrication purposes. This reservoir 20 can be manufactured with or separate from the engine 80, either within or remote from the engine housing/compartment wherein the engine 80 is secured. As shown in FIG. 1, which illustrates a first embodiment of the pre-starting lubrication system 10, the oil reservoir 20 includes an air flow corridor 40 and an oil flow corridor 30. Specifically, the air flow corridor 40 is structured to allow the passage of air A in and out of the reservoir 20 therethrough. Similarly, the oil flow corridor 30 is structured to facilitate the exit and possible entry of oil B therethrough. Connecting the oil reservoir 20, at its oil flow corridor 30, with the engine internal oil pressure system 75 is an oil conduit 35. Through this oil conduit 35, oil B is provided from the oil reservoir 20 to the engine internal oil pressure system 75 for appropriate lubrication of the engine 80. Similarly, an air conduit 41 is connected with the air flow corridor 40. the air conduit 41 is structured to enable the passage of air A from the air supply 45 to the reservoir 20. As such, when air under pressure is introduced into the reservoir 20, the oil B is naturally forced out through the oil flow corridor 30 for lubrication of the engine 80. Additionally, as oil B is supplied by oil supply means to refill reservoir 20, any excess air A will exit the reservoir 20 through air venting means. These air venting means will preferably include an air venting conduit 43 which can either be independently connected with the reservoir 20 or can be connected at the air flow corridor with the air conduit 41.

Connected in fluid flow communication with the air conduit 41 so as to supply a quantity of air A under pressure into the reservoir 20 are air supply means 45. The air supply means 45 will preferably be an air compressor or other air source structured to supply air at a pressure at or slightly above the normal engine operating oil pressure. For example, the air supply 45 can be a standard vehicle air compressor, as is already present in many vehicles such as a truck, an independent air compressor, or a pressurized air tank. When use of the system 10 is desired, switching means actuate a valve positioned on, near or remote from the air supply means 45 to admit air from the air supply means 45 into the reservoir 20. As such, the switching means can be manual, electric, remote, direct or even automatic; i.e., sequenced with the engine starter switch. Further, in the case of many vehicles, the switching means can be dash-mounted for convenience, so long as it functions to admit the air into the reservoir 20 by actuating the appropriate valve on or near the air supply means 45.

When the pressurized air is admitted from the air supply means 45, it will flow through the air conduit 41 and into the reservoir 20 through the air flow corridor 40. The increased air A within the reservoir 20 will then force oil B within the reservoir 20 out of the reservoir 20 through the oil flow corridor 30 as a result of the limited volume within the reservoir 20. As such, the oil B will flow out through the oil flow corridor 30 and through the oil conduit 35 to the internal engine oil pressure system 75 where it will lubricate the engine 80. Generally, the internal engine oil pressure system 75 will include the appropriate conduits and passages to allow the oil to flow to the pistons and wearing parts of the engine where it is needed.

Turning to the air flow corridor 40 and its interconnection with the air supply means 45 by way of the air conduit 41, it will preferably include a three-way valve 42. Specifically, the three-way valve 42 is structured such that when actuated the pressurized air from the air supply means 45 is directed from the air conduit 41 to the reservoir 20 by way of the air flow corridor 40. Further, with the preferred three-way valve 42, when air is flowing from the air conduit 41 through the air flow corridor 40, the venting conduit 43 is sealed off by the internal arrangement of the three way valve 42, allowing no air to flow in either direction through air venting conduit 43.

Subsequently, when the three way valve 42 is deactivated or returned to its normal position, the internal arrangement seals off the air conduit 41 allowing no more air to flow from the air supply 45 to the reservoir 20. Simultaneously, the internal arrangement of the three way valve 42 connects the air flow corridor 40 to venting conduit 43. This venting conduit 43 allows pressurized air A in the reservoir 20 to flow or vent to atmosphere or preferably to the crankcase 70 of engine 80. Furthermore, as the reservoir 20 is refilled with engine oil B to be used for the next pre-starting lubrication, additional air A is allowed to escape from the reservoir 20 to make room for the oil B that is refilling the reservoir 20.

In the case of the preferred embodiment, the switching means will function to actuate the three way valve 42 such that the three-way valve 42 acts as the on/off valve for the air supply 45. Normally the three-way valve 42 would be actuated prior to starting the engine 80. The operator would observe the engine oil pressure gauge and when it rises to near the normal operating oil pressure, the engine 80 would be started. After the engine has been running a few seconds, the three-way valve 42 would be deactivated.

Although oil B in the reservoir 20 can be supplied from an independent oil source, such as through a filler cap/plug 47, it is preferred that the oil B within the reservoir 20 be supplied directly from the engine 80, thereby maintaining a closed system and ensuring that pre-starting lubrication oil B will always be present, so long as the engine 80 is properly maintained and contains normal oil levels. In the preferred embodiments illustrated in FIGS. 1 and 2, the oil conduit 35, will also function to supply the necessary oil to refill the reservoir 20 after each start up. Specifically, the oil conduit 35 is connected with the internal engine oil pressure system 75 in order to supply oil for pre-starting lubrication through the internal engine oil pressure system 75. After pre-starting lubrication is performed, the oil quantities within the reservoir 20 will have decreased, however, the engine 80 is now started and running so as to pressurize its own internal oil pressure system. This pressurization results in oil being forced back through the oil conduit 35 to the reservoir 20, thereby providing oil for a future pre-starting lubrication.

When the reservoir 20 has been vented and de-pressurized by the deactivating of the three-way valve 42, the engine oil pressure system 75 will, as stated, be trying to force oil back to the reservoir via oil supply conduit 35. Accordingly, to prevent the free flow of oil to the reservoir 20, a one-way check valve 32 and a bypass orifice 33 will be included on the oil conduit 35. The one-way check valve 32 will be disposed in line with the oil conduit 35 such that free quantities of oil can flow therethrough only from the reservoir 20 to the engine 80. However, so that small quantities of oil may bypass the one-way check valve 32, and flow back to refill the reservoir 20, the bypass orifice 33 is positioned to circumvent the one-way check valve 32. In one embodiment, illustrated in FIG. 2, the one-way check valve 32 and bypass orifice 33 are separately included and connected in line with the oil conduit 35. Alternatively, however, as illustrated in FIG. 1, both the one-way check valve and bypass orifice may be included in a single valve 31 positioned either directly preceding the oil flow corridor 30, anywhere along the oil conduit 35, or incorporated directly with the oil flow corridor 30. Accordingly, while the engine 80 is operational, the reservoir 20 will become refilled by the engine oil in order to be ready at all times for the next engine start up.

Only a very small portion of the oil output from the engine internal oil pump can bypass the check valve 32 through the bypass orifice 33 such that the engine itself will not be deprived of oil while the reservoir 20 is refilling. As such, the bypass orifice 33 is sized according to the individual engine on which the pre-starting lubrication system is used and the refilling takes place over the first few minutes of operation of the engine 80. After the reservoir 20 is filled, the level maintenance means stops any further flow of oil from the engine oil pressure system 75 to the reservoir 20.

Additionally included with the pre-lubrication system 10 of the present invention are level maintenance means. The level maintenance means are specifically configured and disposed so as to ensure that overfilling or total emptying of the oil reservoir 20 is prevented. In the first embodiment of the level maintenance means, as illustrated in FIG. 1, they will include a stopper float 50 disposed within the reservoir 20. When utilizing this stopper float 50, the reservoir 20 will preferably include a tapered upper and lower surface or other means of guiding the stopper float into a flow sealing orientation, and the air flow corridor 40 will be disposed in a top surface of the reservoir 20, while the oil flow corridor 30 is disposed in a bottom surface of the reservoir 20. In use, the stopper float 50 floats freely within the reservoir 20 atop the oil B. As additional oil enters the reservoir 20, the stopper float 50 will float up and be guided by the tapered upper surface until it moves into a flow sealing orientation 50' wherein the air flow corridor 40 is blocked off by the stopper float 50'. When the float 50' is in the flow sealing orientation, no additional air or oil will exit the reservoir 20 and accordingly no additional oil will flow into the reservoir 20 and the system will not overflow or continue to take oil from the engine 80. However, because the stopper float 50' is freely floating, air can still enter the reservoir 20 in order to push oil out to the engine for the next start up. Similarly, as the oil level within the reservoir drops to a reservoir empty level, the stopper float 50 will flow down into a flow sealing orientation 50" over the oil flow corridor 30. This will prevent air from exiting the reservoir 20 and being introduced into the internal engine oil pressure system 75 while still allowing oil to flow into the reservoir 20 in order to refill it. Alternatively, with this embodiment, the stopper float 50, rather than directly blocking the air flow corridor 40 or oil flow corridor 30, may trigger the sealing off of the respective corridors 30 and 40 such as by contacting a switch or moving a stopper element into place. Furthermore, in another embodiment, as illustrated in FIG. 5, an alternative means to guide the stopper float into flow sealing orientation at either the oil flow corridor 30 or the air flow corridor 40 are included. In this embodiment, a locating guide 51 is suspended by brackets 49 within the reservoir 20 such that the stopper float 50 is contained and constrained within the locating guide 51 but will move freely up and down the locating guide 50 as the oil level rises and falls in the reservoir 20. The locating guide is suspended in reservoir 20 such that neither the top nor the bottom of the guide contacts the reservoir, thereby allowing air as well as oil to flow freely in or out of the guide 51 and ensuring that the oil level within the locating guide 51 remains equal to the oil level in the rest of the reservoir 20. Accordingly, much like the tapered upper and lower portions of the reservoir, as the oil level rises or falls, the stopper float is guided into flow sealing orientation at the air flow corridor 40 or the oil flow corridor 30 by the locating guide 51.

Figure 2:
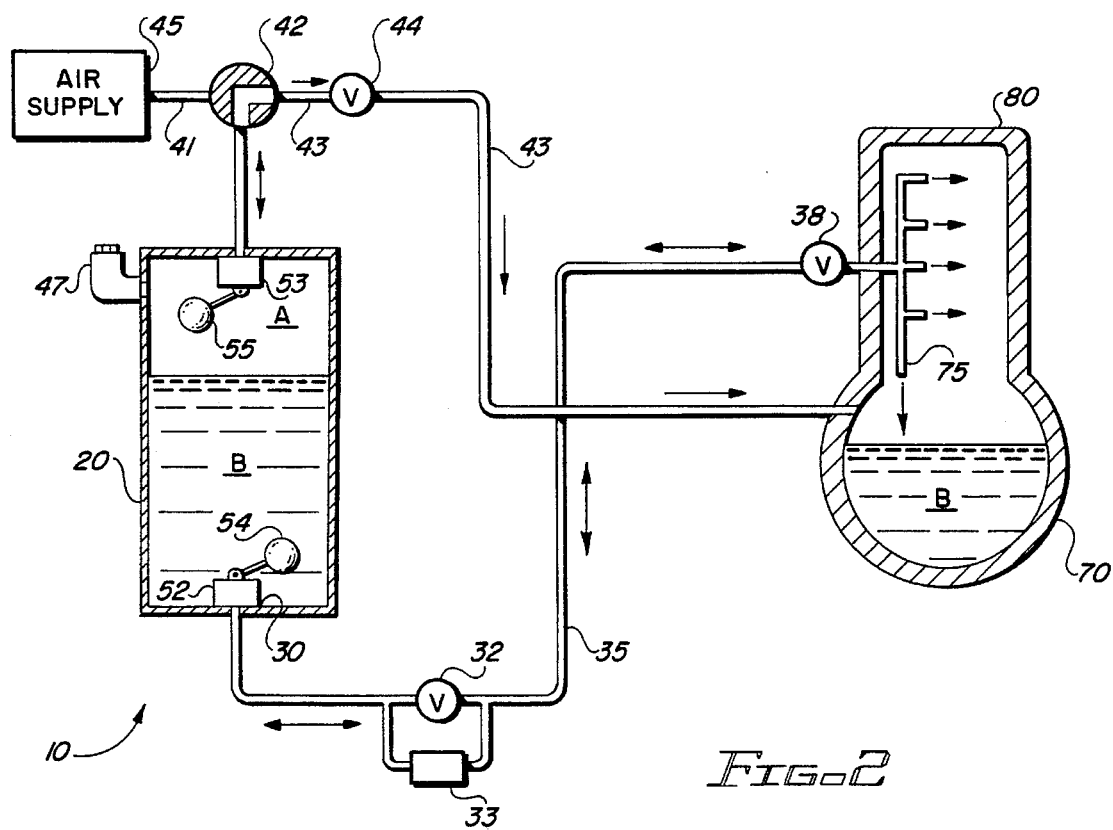
FIG. 2 is a schematic view of a second embodiment of the pre-starting lubrication system of the present invention.

A second embodiment of the level maintenance means, as shown in FIG. 2, includes a pair of float valves 52 and 53. Specifically, each of the float valves 52 and 53 includes an individual float member 54 and 55 interconnected with a sealing mechanism which will seal off the respective valves 52 and 53 allowing no outflow therethrough. In the case of the first float valve 53, it will be disposed at the air flow corridor 40 such that upon the oil level within the reservoir 20 rising to the reservoir full orientation, the float 55 will rise up switching the float valve 53 into an exit flow stopping orientation. Similarly, the float 54 of the second float valve 52, will be suspended within the oil B unless the oil level drops below the float 54 to a reservoir empty level resulting in downward movement of the float 54. Upon downward movement of the float 54, the second float valve 52 is switched into an exit flow stopping orientation wherein no oil or air exits through the oil flow corridor 30 and no air flow enters the reservoir through the air flow corridor, but oil can still flow into the reservoir 20 via the oil flow corridor 30 to refill the reservoir 20.

Turning to a third embodiment, illustrated in FIG. 3, the level maintenance means will merely include a mount bracket 56 structured to mount the reservoir 20 at an elevation such that the top of the reservoir 20 is at or slightly above the level of the oil in crank case 70 since gravity will not fill the reservoir higher than the level of the oil B in the crank case 70. Although the single oil conduit 35 configuration of the previous embodiments may be employed, in this embodiment, the oil conduit 35 will merely include the one-way check valve 32 such that oil may only flow through the oil conduit 35 from the reservoir 20 to the internal engine oil pressure system 75. Accordingly, an additional supply conduit 36 is included to supply oil to the oil reservoir 20. The supply conduit 36 will also include a one-way check valve 37 which is disposed such that oil may flow from the crankcase 70 into the oil reservoir 20 therethrough, but no oil or air to flow will be permitted from the reservoir 20 to the crankcase 70. In this embodiment, because the elevation of the reservoir 20 will generally be below the elevation of the crank case 70, normal gravitational forces will maintain an oil level within the reservoir 20 equal with the oil level within the crankcase 70.

As illustrated in FIG. 4, some engine oil systems include separate oil reserves 71 and do not merely utilize the crankcase 70. In this case, a conduit 73 conducts oil from the reserve 71 to the internal engine oil system 75 and a separate conduit 72 returns the engine oil to the reserve 71 by forces of gravity or by a "scavenger" pump within the engine depending on whether the reserve 71 is disposed below or above the crankcase 70, respectively. As such, connections previously described as being made with the crankcase 70 itself will be made with the separate reserve 71.

Referring again to FIG. 3, when oil exits the reservoir 20 during pre-starting lubrication and the oil level has been lowered below that of the oil in the crankcase 70, the forces of gravity will result in a quantity of oil exiting the crankcase 70 and entering reservoir 20. This, however, will only occur after the reservoir 20 has been vented, such as by deactivating the three-way valve 42, which reduces the air pressure in reservoir 20 to equal that in crankcase 70, or the atmosphere, depending on the venting means. When this occurs, the forces of gravity will cause oil to flow from the crankcase 70 into the reservoir 20 until equilibrium between the oil levels is reached. Regarding the mount bracket 56, any manner of mounting, connection or placement of reservoir 20 in order to provide for the proper elevation of the reservoir is adaptable. Specifically, if the oil reservoir will preferably not be mounted within the overall engine housing, but rather it may be merely secured on a platform or other support so as to maintain proper elevation between the reservoir 20 and the crankcase 70.

Also, in this embodiment, to prevent total emptying of the reservoir 20 and possible introduction of air into the oil system 75, the lower portion of the reservoir 20 can be provided with tapered sides and a stopper float 50 as shown in FIG. 1. Alternatively the reservoir 20 could be provided with the locating guide 51 and stopper float 50 as shown in FIG. 5, or the float valve as shown in FIG. 2. All three of these aforesaid alternatives would function in exactly the same manner as previously described.

As some additional safeties, the oil conduit 35 will preferably include a shut off valve 38 as shown in FIGS. 1 through 4. This shut off valve 38 will preferably be manually actuated and will be structured to completely seal off the oil conduit 35 and prevent flow in either direction between the reservoir 20 and the internal engine oil pressure system 75. In the case of the third embodiment, FIG. 3, the supply conduit 36 is also preferably provided with an oil shut off valve 38. This valve will also be preferably manually actuated and will be structured so as to completely seal off flow in either direction between the reservoir 20 and the crankcase 70 via oil supply conduit 36. Shutting down is particularly important in case of malfunction, maintenance and repair, or if the system will be shut down for extended periods of time. Further, a one-way check valve 44 as shown in FIGS. 1 and 2 can preferably be connected in line with the venting conduit 43. In particular, if the engine is shut down and the reservoir 20 is disposed at an elevation which is higher than the crank case 70 and/or internal engine oil pressure system 75, natural gravitational tendencies may cause oil to drain from the reservoir 20 to the internal engine oil pressure system 75. When the engine is inoperative and after extended periods of time, this can completely drain the reservoir 20 and can result in the pre-starting lubrication system being unable to lubricate the engine prior to the next start up. As such, by including the one-way check valve 44, which will only allow air to flow from the three-way valve 42 to the crankcase 70 or other venting location, air cannot be drawn into the reservoir 20 through the air flow corridor 40 unless the air supply means 45 are functioning. Accordingly, because no additional air can enter the reservoir 20, the vacuum effect will keep the oil within the reservoir 20 from seeping out through the oil flow corridor 30 and oil conduit 35 to the engine internal oil system 75.

As an alternative, in FIGS. 1, 2, 3 and 5, a filler cap/plug 47 has been provided to fill the reservoir manually for initial installation and start up of the pre-starting lubrication system and/or when the engine oil B is to be routinely changed and both the crankcase 70 and the reservoir 20 have been drained of oil.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

Now that the invention has been described,

What is claimed is:

1. A pre-starting lubrication system to be used on an engine having an oil reserve, wherein engine lubricating oil is contained, and an engine internal oil pressure system structured to distribute lubricating oil to wearing parts of the engine from the oil reserve, said pre-starting lubrication system comprising;

an oil reservoir structured to contain a quantity of engine oil therein, said oil reservoir including an air flow corridor wherethrough air enters and exits said oil reservoir, and an oil flow corridor, wherethrough oil enters and exits said oil reservoir, said oil flow corridor being connected in fluid flow communication with the engine internal oil pressure system by an oil conduit, said air flow corridor being connected in fluid flow communication with air supply means by an air conduit, said air supply means being structured to selectively supply a quantity of air under pressure, air venting means structured and disposed to selectively permit air from venting out of said oil reservoir, oil supply means structured to supply said quantity of engine oil into said oil reservoir, switching means structured to initiate and maintain air flow from said air supply means through said air flow corridor and into said oil reservoir so as to push oil out of said oil reservoir, through said oil flow corridor, and into the engine internal oil pressure system, through said oil conduit, for pre-starting lubrication distribution of the oil to the wearing parts of the engine, level maintenance means structured to prevent overfilling or total emptying of said oil reservoir, and accordingly preventing the oil from exiting said reservoir through said air flow corridor and the air from exiting, said reservoir through said oil flow corridor, said air flow corridor being disposed in a top surface of said reservoir and said oil flow corridor being disposed in a bottom surface of said reservoir, said level maintenance means including a stopper float disposed in said reservoir so as to float on the oil contained therein, said stopper float being structured to seal off said air flow corridor upon an oil level in said reservoir rising to a reservoir full level, and to seal off said oil flow corridor upon said oil level in said reservoir dropping to a reservoir empty level, said reservoir further including a tapered upper surface which tapers inwardly to said air flow corridor so as to guide said stopper float into its flow sealing orientation over said air flow corridor, and said reservoir including a tapered lower surface which tapers inwardly to said oil flow corridor so as to guide said stopper float into its flow sealing orientation over said oil flow corridor.

2. A pre-starting lubrication system as recited in claim 1 wherein said reservoir includes a locating guide wherein said stopper float is disposed, said locating guide extending substantially from said air flow corridor to said oil flow corridor so as to correspondingly guide said stopper float into its flow sealing orientation over said air flow corridor and said oil flow corridor.

3. A pre-starting lubrication system as recited in claim 1 wherein said level maintenance means includes a mount bracket structured to mount said reservoir at an elevation equal to an elevation of the oil reserve of the engine such that gravitational forces will maintain an oil level in said reservoir equal to an oil level in the oil reserve of the engine, said oil level in said reservoir being a reservoir full level in said reservoir.

4. A pre-starting lubrication system as recited in claim 1 wherein said oil supply means includes a supply conduit connected in fluid flow communication with the oil reserve of the engine, said supply conduit including a one way check valve so as to prevent the oil from exiting said reservoir into the oil reserve of the engine.

5. A pre-starting lubrication system as recited in claim 1 wherein said oil conduit includes a one way check valve structured and disposed to prevent oil from flowing therethrough from the engine internal oil pressure system to said reservoir.

6. A pre-starting lubrication system as recited in claim 5 wherein said oil supply means includes a bypass orifice disposed in said oil conduit so as to enable small quantities of the oil to by pass said one way check valve of said oil conduit and flow from the engine internal oil pressure system to said reservoir in order to fill said reservoir during operation of the engine.

7. A pre-starting lubrication system as recited in claim 5 wherein said one way check valve of said oil conduit and said bypass orifice are included in said oil flow corridor.

8. A pre-starting lubrication system as recited in claim 1 wherein said oil conduit includes a shut off valve structured to prevent fluid flow therethrough.

9. A pre-starting lubrication system as recited in claim 1 further including a three way valve, said three way valve being structured to connect said air conduit, said air flow corridor, and a venting conduit of said air venting means in fluid flow communication with one another.

10. A pre-starting lubrication system as recited in claim 9 wherein said venting conduit is connected with the oil reserve of the engine.

11. A pre-starting lubrication system as recited in claim 9 wherein said three way valve includes an activated mode and a deactivated mode, said activated mode permitting air to flow from said air supply means, through said air conduit, into said reservoir, through said air flow corridor so as to push oil out of said reservoir through said oil flow corridor, while preventing air from flowing out of said reservoir, through said air flow corridor, into said venting conduit, and said deactivated mode permitting air to vent from said reservoir, through said air flow corridor, into said venting conduit such that oil is able to flow into and refill said reservoir, while preventing air from flowing from said air supply means, through said air conduit, into said reservoir, through said air flow corridor.

12. A pre-starting lubrication system as recited in claim 11 wherein said switching means are structured to switch said three way valve between said activated mode and said deactivated mode.

13. A pre-starting lubrication system as recited in claim 1 wherein said air supply means includes an air compressor structured to supply air at about 40–80 psi.

14. A pre-starting lubrication system as recited in claim 1 wherein said air supply means includes a high pressure air storage bottle.

* * * * *